United States Patent [19]

Parker et al.

[11] 4,275,398
[45] Jun. 23, 1981

[54] FM RADIO RANGING SYSTEM

[75] Inventors: William H. Parker; Harry T. Davidson, both of Hurst, Tex.

[73] Assignee: Del Norte Technology, Inc., Euless, Tex.

[21] Appl. No.: 27,904

[22] Filed: Apr. 6, 1979

[51] Int. Cl.³ .............................................. G01S 3/02
[52] U.S. Cl. .......................... 343/112 R; 343/17.2 PC
[58] Field of Search ....... 343/112 R, 112 D, 17.2 PC, 343/6.5 R, 6.5 LC

[56] References Cited

U.S. PATENT DOCUMENTS

| | | | |
|---|---|---|---|
| 3,553,691 | 1/1971 | Lassiter | 343/15 |
| 3,654,554 | 4/1972 | Cook | 343/17.2 PC |
| 3,810,179 | 5/1974 | Merrick | 343/6.5 LC |
| 3,875,571 | 4/1975 | Davis, Jr. et al. | 343/6.5 R |
| 3,969,725 | 7/1976 | Couvillon et al. | 343/17.2 PC |
| 4,037,159 | 7/1977 | Martin | 343/17.2 PC |
| 4,115,773 | 9/1978 | Metcalf | 343/7 AG |
| 4,145,690 | 3/1979 | Petitjean et al. | 343/17.2 PC |

OTHER PUBLICATIONS

G. Burkland, New Technology Promises Improved Navigational Systems for Seismic Ships, Offshore Magazine, 1976, pp. 228, 231, 232.

*Primary Examiner*—Theodore M. Blum

[57] ABSTRACT

A radio locator system uses transceivers located in a mobile and at least two stationary stations. Each stationary station serves as one end of a surveyor's baseline. Therefore, since the transceivers are located at opposite ends of a line having a known length, their broadcast signals provide direct distance measurements of two other lines extending between the individual stationary stations and the mobile unit, thereby cooperating with the known line to complete a trilateralization. Each station in the system is identified by a uniquely encoded stream of pulse bursts, each burst encompassing a wide, preprogrammed change of frequency for eliminating interference between the signals used in the locator system and the signals of other users of the same frequency band. An inversion of the preprogrammed frequency change is used for the return of the ranging system signal in order to substantially eliminate or suppress echo returns to the mobile or interrogator station. The sound of the preprogrammed station identifying frequency changes is sometimes called "chirping".

19 Claims, 6 Drawing Figures

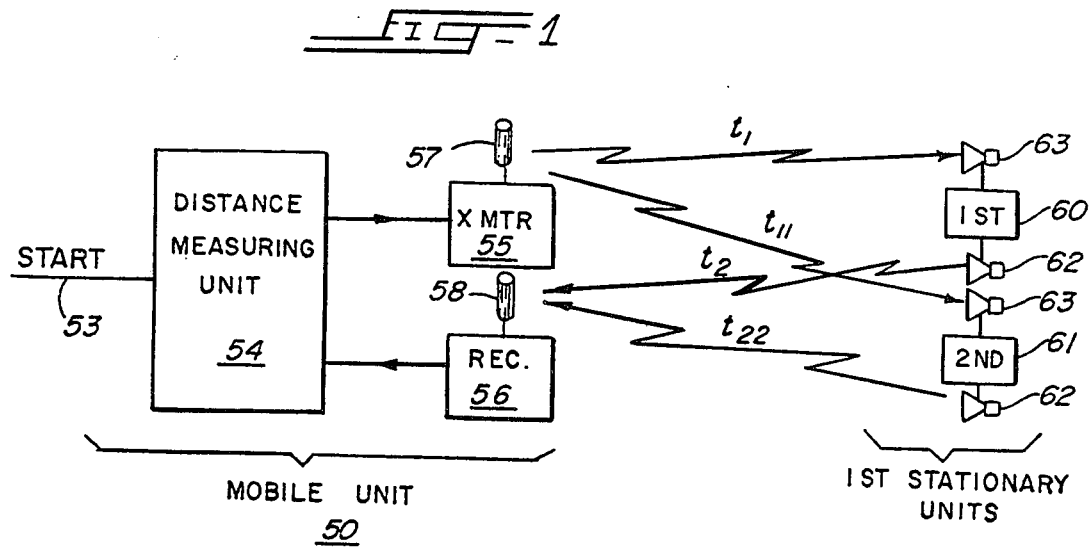
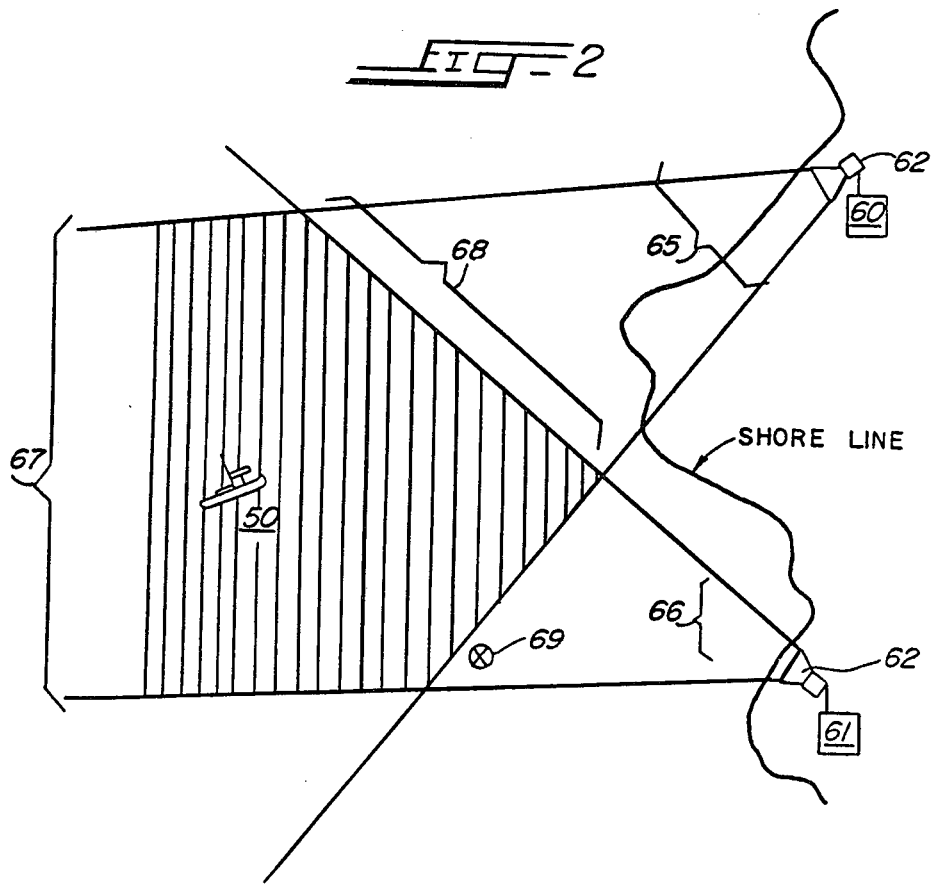

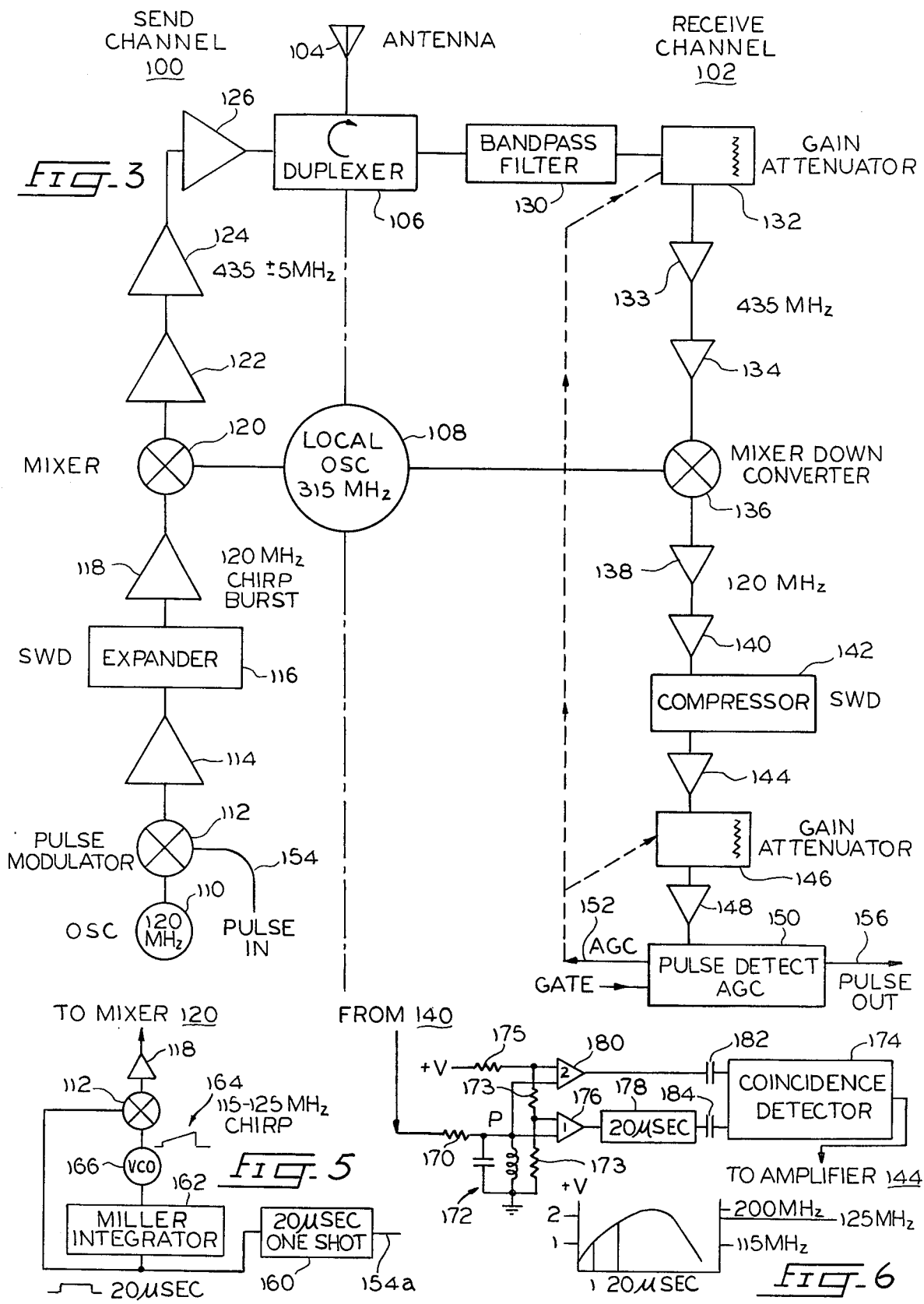

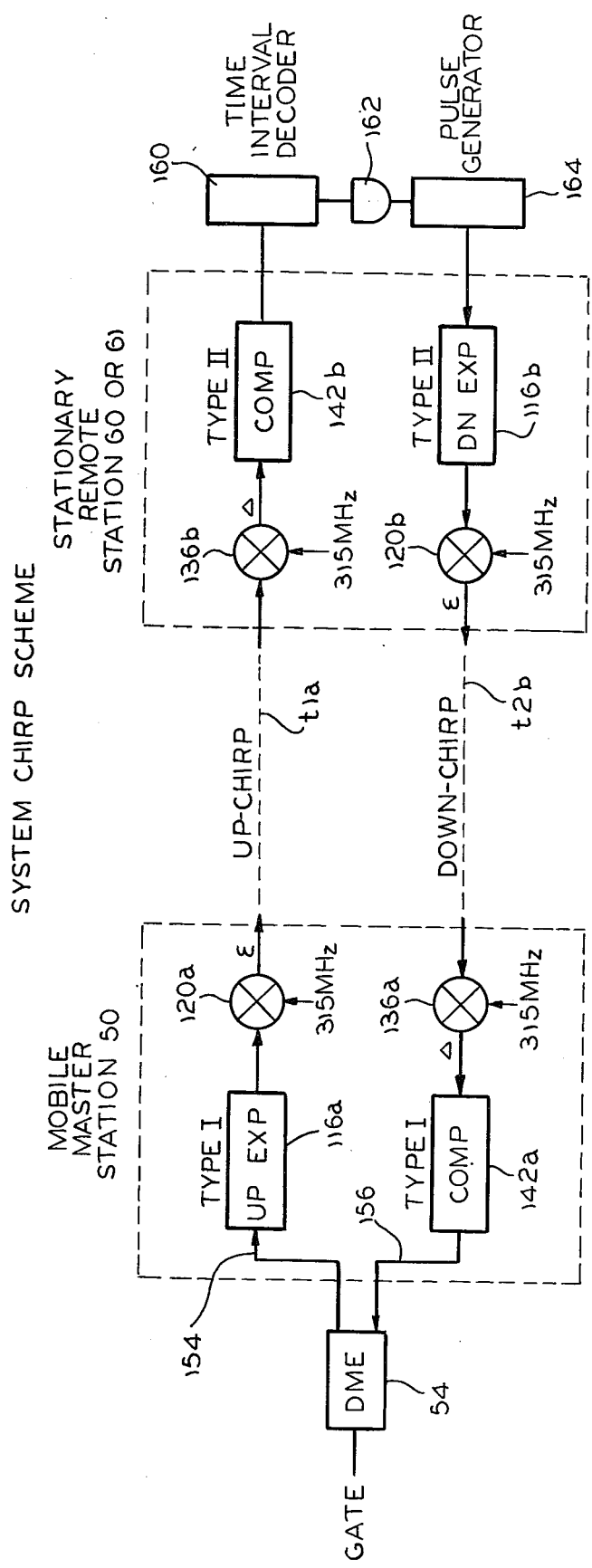
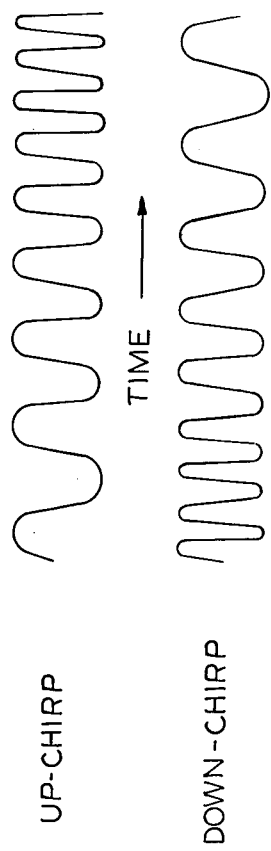
FIG. 4

FM RADIO RANGING SYSTEM

This invention relates to FM radio ranging and location systems, and to ranging equipment used in such systems, and more particularly to trilateralization systems with reduced bandwidth requirements.

In the following specification it will be convenient to refer to "chirping", "up-chirping", and "down-chirping". A "chirp" is a limited duration burst of an oscillating frequency which changes its frequency, with time, in a preprogrammed or predetermined manner. An "up-chirp" occurs when the change in frequency rises in pitch, or when the frequency increases with time. A "down-chirp" occurs when the frequency lowers in pitch or when the frequency decreases with time.

The preprogram of frequency changes is sometimes called a "signature", which may be assigned to identify either the equipment originating the chirp or the equipment assigned to receive the chirp. Some equipment may be designed to respond only when its signature is an up-chirp, and other equipment may be designed to respond only when its signature is a down-chirp. Thus, each of two stations may reliably respond to only its own signature despite the fact that the frequencies of those two signatures are identical, but the preprogrammed frequency changes are inverted.

In World War II, and afterward, Shoran was used successfully for many years in the 1.5 m and 0.7 m band, with a useful range extending up to about fifty miles. However, Shoran has not been used in the United States for a number of years due to the massive pulse power requirement that was required to give it a useful gain. The high power of Shoran transmitters obliterated the signals of adjacent-channel users.

This invention relates to radio ranging systems using chirping signatures to provide an improvement over the systems disclosed by Merrick in U.S. Pat. No. 3,810,179, granted May 7, 1974, and by Metcalf in U.S. Pat. No. 4,115,773, granted Sept. 19, 1978. The Merrick patent discloses a radio location system which does not require the massive power of Shoran equipment. The Merrick system is based on a use of bursts of first and second frequencies which are generated in cooperating transponders. The interrogating distance measuring equipment is operated on a frequency other than the interrogation frequency, to give an immunity to radar-like echoes of the interrogation burst. This is a clear advantage over earlier patents which taught digital echo ranging. The Merrick method operates in microwave wavelengths. Therefore, the resulting Merrick system does not usually propagate beyond the horizon, which imposes geographical limitations on its utility. However, since the signals do not travel very far, a suitable spectrum bandwidth is readily available everywhere in the world. Metcalf discloses a way of preventing a transmission loss of pulse characteristics in the Merrick system.

Lassiter (U.S. Pat. No. 3,553,691) discloses signal enhancement with pseudo-random phase modulation, leading to a system having a 170 dB link gain; or, stated otherwise, Lassiter's system is capable of communicating over a path having a loss of 170 dB. Davis, Jr. et al. (U.S. Pat. No. 3,875,571) describe a system, equal to the Lassiter system, which uses pulse expansion and recompression. Both of these systems depend on tropospheric-path propagation when operated at their extreme range. Both systems generate a certain amount of interference with other users who may be sharing the same frequency band, since non-interference is not an object.

An object of this invention is to overcome the objections to these and similar prior art systems by dispersing the transmitted pulse over a wide bandwidth so as not to produce interfering signals which may be picked up by other users of equipment broadcasting in the same bandwidth.

Another object of this invention is to effectively eliminate the necessity of using the second frequency which is taught by Merrick (Col. 3, lines 7–8). Thus, an object is to reduce the frequency allocation required by the system, since it is becoming increasingly more difficult to obtain such allocations from various governments.

A mutual interference problem continues to plague prior radiolocation systems, since radiolocation is almost always subordinated to the needs of other users of essentially the same radio spectrum. Therefore, another object of this invention is to effectively eliminate interference to users of other equipment operating in the same frequency band. Stated another way, an object of the present system is to enable a secondary user to operate without the priority user being aware that the radiolocation signals are present in their frequency band.

In keeping with an aspect of this invention, these and other objects are accomplished by providing a radiolocation system which depends upon triangulation. Two stationary transponders are set up a predetermined distance apart. A mobile transponder sends radio signals to each of the stationary transponders and measures the time required to send and then receive a responsive signal which is returned from the stationary transponders. From the measured time for the round trip of the radio signal, the mobile transponder detects the distance between it and each of the stationary transponders. To identify each of the stations in the system, the various signals are transmitted at a particular chirping frequency sweep. The same station receives (or sends) with an up-chirp and sends (or receives) with a down-chirp. Hence, the station cannot confuse an immediate echo of the signal which it is sending with the signals which it is receiving from a distant station.

A preferred embodiment of the invention will be understood best from the following description, taken with the attached drawings, wherein:

FIG. 1 is a block diagram of the inventive system, including a first of mobile station and two other or stationary stations, which together enable a triangulation measurement;

FIG. 2 schematically represents the use of the inventive system with respect to an exemplary ship-to-shore location;

FIG. 3 is a logic diagram of a transponder for use at any of the stations in the radio locator system of FIG. 1 and FIG. 2;

FIG. 4 is a block diagram showing how the system is designed to achieve non-interfering signals through a use of up-chirping and down-chirping;

FIG. 5 is a block diagram showing a voltage controlled oscillator used to produce a chirp signal; and FIG. 6 is a block diagram which shows a comparator used to detect a down-chirp.

The principal units in the inventive radar system are disclosed in FIG. 1 as a first or mobile station 50 and at least two other or stationary stations 60 and 61. The mobile station may be located on a sea, land, or air vehicle; or it could be hand carried. It includes suitable controls symbolically indicated by a start wire 53, a distance measuring unit (DME) 54, and a transceiver (or transmitter-receiver) combination 55, 56. The transceiver drives any suitable omnidirectional antenna means, here symbolically shown as transmit and receive antennas 57, 58. However, it should be understood that either a single antenna or a pair of antennas may be used and that a colinear array is preferred. A colinear array of dipoles is equal to a slotted array, at the centimetric wavelength.

The stationary stations include transceivers or transmitter and receiver combinations 60, 61, each having an associated antenna means, here shown symbolically as transmit and receive antennas 62, 63, respectively. Again, separate transmit and receive antennas are shown for convenience of description only. A single antenna is preferably used at each stationary station. These antennas may have directional characteristics; however, colinear arrays may also be used for the stationary station.

Merrick taught that two X-band channels may be used to separate the transmission between the mobile station 50 and each of the stationary stations 60 or 61. The transmit and receive radio frequency links between the mobile station and the first stationary station 60 are here designated $t_1$, $t_2$, and the comparable links to the second station 61 are designated $t_{11}$, $t_{22}$. Since the stations 60, 61 function as bench marks at the opposite ends of a surveyor line, they are preferably placed to provide a non-obstructed signal path. The invention provides means for combining the transmit and receive channels $t_1$, $t_2$, or $t_{11}$, $t_{22}$.

In operation (FIG. 2), the receiving antennas of the stationary stations 60, 61 are oriented to direct their horizontal patterns toward the mobile station 50. Thus, the antenna patterns 65, 66 of the stationary stations 60, 61, respectively, overlap in the area 67, 68 which is cross-hatched for easy identification. The mobile station 50 may move anyplace within this area and obtain a reliable operation.

According to the invention, each of the stationary stations 60, 61 has a code or signature assigned thereto for the purpose of identifying it. Here, the code or signature is transmitted in the form of a unique repetition interval of the chirping signal. The mobile station 50 may send interrogation signals in the form of a code or signature transmitted at a repetition rate identifying any particular stationary station in the area. When that identified stationary station detects an incoming code or signature at its repetition rate, it replies. When the mobile station 50 detects the return of the reply at the transmitted repetition rate, it accepts it and gives a read out of the time required for the round trip of the interrogation and reply, with the read out preferably being in the terms of distance.

Except for the use of a chirping signal, the system described thus far is about the same as the system disclosed in the Merrick U.S. Pat. No. 3,810,179, which is owned by the assignee of this invention. In the Merrick system, a timing instant is converted into a frequency burst at 9450 MHz, for example, in the cooperating transceiver in order to maintain the integrity required for distance measuring. Thus, the system has consumed about 10 MHz of the available bandwidth. In order to complete the measurement process, another 10 MHz is needed to accommodate a reply pulse on another frequency such as 9350 MHz, for example, so that the interrogator can communicate without accepting an echo-like return of the originating pulse. Otherwise, the transmitting station might detect its own outgoing pulse and treat it as if it were a reply pulse from a nearby station. Thus, the Merrick system may become unreliable beyond very short ranges, when operated in a cluttered or congested work area.

According to the invention, the transponder of FIG. 1 prevents a response to its own echo by use of up-chirping for transmission in one direction and down-chirping for transmission in the opposite direction. A station is not sensitive to an inverted chirp direction (e.g. the interrogation station is not sensitive to the chirp direction of the interrogating burst). This feature of the invention eliminates a need for a second frequency allocation. Since a second frequency is not required, the required bandwidth is cut in half.

FIG. 3 shows an exemplary transponder for providing the chirping signal. This transponder has a send channel 100 and a receive channel 102, here shown on opposite sides of a dividing dot-dashed line. These two channels share a common antenna 104, a duplexer 106, and a local oscillator 108.

The send channel 100 comprises a local oscillator 110 and, connected thereto in cascade, a pulse modulator 112, an amplifier 114, an expander 116, an amplifier 118, a mixer 120, and three stages of amplification 122, 124, 126. The oscillator 110 may, for example, operate at a frequency such as 120 MHz. The local oscillator 108 may, for example, have a frequency in the order of 315 MHz. For example, these frequencies may produce a system operational frequency of 435 MHz through this atmosphere.

The expander 116 may include any suitable frequency control means, such as a surface wave device, a voltage controlled oscillator, a delay line, or the like. At present, the preferred expander is a surface wave device. (The term "expander" is used generically herein to cover all suitable devices which may be used to disperse narrow pulses over a preprogrammed chirp spectrum).

The receive channel 102 comprises, in cascade, a band pass filter 130 connected to the output of the duplexer 106, a gain attenuator 132, amplifiers 133, 134, mixer 136, amplifiers 138, 140 compressor 142, amplifier 144, gain attenuator 146, amplifier 148, and pulse detector 150. The mixer 120 in the send channel and the mixer 136 in the receive channel share the output of oscillator 108. The compressor 142 may also include any suitable expander, such as a surface wave device, for example. An automatic gain control circuit 152 feeds back a signal to control gain attenuators 132, 146 for maintaining a uniform signal in the receive channel 102. One example of such automatic gain control circuit is found in the Metcalf U.S. Pat. No. 4,115,773.

The transponder having channels 100, 102 may be included as a part of any of the various stations shown in FIGS. 1 and 2. When this transponder is located in mobile station 50, the circuitry of FIG. 3 may be located in boxes 55, 56 of FIG. 3 of the Merrick U.S. Pat. No. 3,810,179.

A timing pulse generated in the distance measuring unit in mobile station 50 (FIG. 1) is applied at 154 in FIG. 3 to gate a short burst (e.g. 0.1 μsec) of 120 MHz (from oscillator 110) through pulse modulator 112. After a conditioning amplifier 114 sets the signal strength, this burst is stretched by the surface wave device or similar expander 116 into a longer burst (such as 20 μsec). During the pulse expansion, the expander or surface wave device causes a unidirectional linear frequency change with respect to time in order to encompass a preprogrammed spread of MHz (e.g. 115-125 MHz or 125-115 MHz) at the output of expander 116. This modulation contains an optimum selected frequency versus time chirp for the expanded pulse duration (0.5 MHz per microsecond in this example). Other chirp rates are practical, provided that the chirp rate is adequate to prevent its detection in a receiver having a usual bandwidth, such as the various receivers of other band-sharing users. A chirp rate of 1 MHz per $\mu$sec or greater would be preferred, for instance. However, in most countries, the chirp characteristics may depend upon bandwidth allocations.

The long burst out of the expander 116 is again amplified at 118 and up-converted in mixer 120 to the operating frequency, for example, into the frequencies of an FM sideband of $315+120\pm5$ MHz $=435\pm5$ MHz. The resulting signal is amplified in a cascade of amplifiers 122-126, to the desired output level. In one version, the system is able to produce up to 100 watts of output power. This 20 $\mu$s burst is then fed through a duplexer 106 to the antenna 104 where it is radiated. Additional amplification could be added at the expense of isolation from conventional users.

For this example, let the chirp direction be defined as an increasing frequency ("up-chirp") at the transmission antenna 104.

This radiated chirping burst then travels to the stationary station 61 where the transponder is configured with an "interval time decoder" which may be substantially the same as the detector seen in FIG. 6. of the Merrick U.S. Pat. No. 3,810,179. If the requisite number of timed interval pulses are received and acknowledged, a cooperating reply is initiated. Before the reply occurs, the up-chirp enters through the antenna 104 of station 61, passes through the duplexer 106, filter 130, gain attenuator 132, amplifiers 133, 134, and is converted to 115-125 MHz in a down-converting mixer 136. An intermediate frequency cascade then conditions the up-chirping burst and loads or entrains that burst into the surface wave device (SWD) of the compressor 142, here configured to respond to an up-chirping burst matching the original burst broadcast from the mobile station. (The term "burst" indicates a condition where a charge accumulates over a predetermined time period to a threshold level and then discharges with an effect similar to bursting.)

When the up-chirping burst fills a matching filter of the expander or surface wave device of the compressor 142, a pulse output reproduces the originating pulse (which was sent into the mobile station input terminal 154). This reproduced pulse is then amplified in the stationary station, adjusted in gain to an optimum amplitude in the attenuator 146, and fed to the pulse detector 150. The output pulse is then taken from the output terminal.

Within the stationary station, the pulse is gated as taught in the Merrick decoder 70 (FIG. 3) of U.S. Pat. No. 3,810,179). This gating is used to relaunch a "new" timing event, for reply to the mobile station 50. This event is launched in the send channel 100 of the stationary station, except that the expander 116 is configured to produce a down-chirp reply. The compressor 142 in the transponder at the mobile station 50 is configured to respond to only a downwardly chirping signal. The reply pulse is thus used to complete the radio ranging linkage from mobile-to-stationary-to-mobile where the elapsed time is measured and converted to provide a conventional distance indicating output. The interrogation is usually repeated a number of times to improve accuracy through averaging.

Other stationary transponders are then interrogated in a similar manner, except the pulse interval or repetition rate is changed to provide a signature or to match an individually programmed interval for identifying each transponder in the network.

FIG. 4 describes one way to implement the chirping distance measurement in the radio ranging system. More particularly, the distance measuring equipment 54 is shown in association with the mobile master station 50. The station 50 transmits with up-chirping over channel t1a to a stationary remote station 60 or 61. The up-chirping signal is created in the expander 116a and mixed in mixer 120a to produce a swept band of frequencies which are transmitted. At the stationary station, the radio operating frequency is removed at the down-converting mixer 136b and reconverted from the up-chirp, back to the original pulse at the compressor 142b. Only the sweeping frequency is transmitted.

After a turn-around time in the stationary station, a reply pulse is converted to a down-chirp in compressor 116b and mixed to become the operating radio frequency in mixer 120b. Station 60 or 61 transmits with down-chirping over channel t2b to the mobile station 50, where the operating radio frequency is removed by converting in mixer 136a. The down-chirping, now at 120 MHz, is reconverted to the original signal in compressor 142a. This is the reply pulse.

The distance measuring unit (DME) 54 measures a time period beginning with the transmission of a pulse through input 154, over channel tya, through time interval decoder 160, gate 162, pulse generator 164, over channel t2b, and through output 156 to the DME, as a time delayed pulse. This time interval is read out in terms of the distance over which channels t1a and t2b extend.

The distance measuring equipment can be located at either end of the transmission channels, thus reversing the chirp sense. Also, instead of two different expanders or surface wave devices, a second local oscillator, such as 555 MHz, for example, might be employed to enable a use of only one type of expander or surface wave device, in each transponder. However, there might be some loss of accuracy of distance measurement because there could be an adverse spectrum drift in the expansion and recompression.

A surface wave device is preferred for the expander 116 because its frequency output is not subject to change due to component aging, which is especially important since most governments insist upon a complete and very accurate control of radiated spectrum. In the present case, the preferred surface wave devices are made on "zero-temp" quartz by Hughes Aircraft, Fullerton, Calif. However, other manufacturers also have technology which produces devices of equivalent stability and utility.

Chirp signals can also be produced by expanders incorporating common voltage controlled oscillators, as shown in FIG. 5. This FIG. 5 shows a start wire 154a which corresponds to start wire 154 (FIG. 3), mixer 112, and amplifier 118 which connects directly to the mixer 120 of FIG. 3.

In this embodiment, a circuit 160 is a one shot multivibrator which provides a timing pulse leading to a linear ramp having a 20 $\mu$sec duration (from start to end of transmission time) and is used to sweep an oscillator. The multivibrator 160 drives a Miller integrator 162 to provide a ramp voltage pulse 164. The voltage controlled oscillator 166 output is then multiplied or mixed at 112 to reach the requisite 115–125 MHz frequency which is fed directly to the amplifier 118 of FIG. 3. The timer circuits 160, 162 are used to control the ramp generator and to gate an output to the amplifier 118.

Certain delay timing would be different, which would necessitate a readjustment in the turn-around delay in the DME. In principle, the generated pulse chirp matches the preprogrammed frequency sweep characteristic of the receiving compressor 142 in the cooperating transponder. Likewise, those who are skilled in the art will perceive additional chirp generators which may provide the preprogrammed sweep.

In FIG. 3, compressor 142 is programmed to recover the spectrum only when there is an up-chirp rate of 0.5 MHz per μsec. This up-chirp must persist for 20 82 sec to substantially fill the filter in a train. Thereupon, the filter reproduces the whole spectrum in a pulse which is only 0.1 μs in duration. Any lesser spectrum is diminished in output amplitude because the SWD filter rejects alien signals.

FIG. 6 shows an alternative coincidence circuit which may be used to replace the SWD compressor 142 of FIG. 3. The input to the circuit of FIG. 6 is connected to the output of amplifier 140 and the output of the circuit of FIG. 6 is applied to the input of amplifier 144. The input circuit of FIG. 6 comprises a coupling resistor 170, a tank or an oscillating circuit 172, a voltage divider 173 and a load resistor 175. The control inputs on a pair of amplifiers 176, 180 are connected to the voltage divider 173 which sets bias potentials such that the amplifier 176 conducts when an input voltage reaches level 1 (about 115 MHz), and the amplifier 180 conducts when the input voltage reaches level 2 (about 125 MHz). The output of amplifier 176 triggers a timer 178 which has the effect of delaying such an output for a period of 20 μsec. The output of amplifier 180 is not delayed, but is immediately effective. Therefore, responsive to a normal chirp signal having 20 μsec duration, pulses originating at amplifiers 176, 180 are applied simultaneously through two integrating capacitors 182, 184 to a coincidence detector 174, which may be a Fairchild type 733 comparator.

FIG. 6 includes a curve which shows the frequency-voltage characteristics with respect to time of tank circuit 172. The voltage appearing at point P rises to a peak level, as the frequency of an applied voltage sweeps from less than 115 MHz (level 1) through 125 MHz (level 2) to about 200 MHz. The time required for the voltage controlled by tank circuit 172 to rise from level 1 to level 2 is about 20 μsec.

More particularly, responsive to the receipt of a possible chirp signal, the intermediate frequency signal from amplifier 140 is fed through a lossy resistor 170 to excite a parallel tank or oscillatory circuit 172 which is resonant at, say, 200 MHz, for example. The response across the tank circuit 172 is optimum when driven by a signal sweeping through 115 MHz, which reaches the detector level 1. At this level, comparator 174 switches on. The sweeping frequency continues at a rate of 0.5 MHz/μsec toward the end frequency of 125 MHz which appears in 20 μsec, where level 2 detector 180 trips.

At level 1 there is an output from circuit 176 which starts an adjustable timer 178 to measure a time period equal to the length of a chirp signal in order to anticipate the arrival of the end point of the chirp. At level 2, there is an output from detector 180 if the chirp signal continues to excite the slope of the filter formed by tank circuit 172. Both the delayed pulse out of circuits 176, 178 and the pulse from circuit 180 are differentiated by capacitors 182, 184 and fed to the coincidence detector 174.

This detector 174 may be in the form of dual-gate field effect transistors, which are known to those skilled in the art. When coincidence occurs, a pulse is sent to amplifier 144 which is then detected, as described above in connection with FIG. 3.

An alternative, though less optimum means of detecting the chirp envelope, uses an additional oscillator to supplement oscillator 108 to detect a down-chirp. Another oscillator operating at 555 MHz drives mixer 136 so that the converted intermediate frequency fed into amplifier 138 contains the chirp, with spectrum inversion. The circuit of FIG. 6 is used when the transmitted rf chirp is preprogrammed with a decreasing sweep. The circuit of FIG. 6 detects this invert spectrum down-chirp.

Also, this system will operate at other frequencies depending upon the choice of suitable oscillators in the up and down converters. For example, converters may convert to the 9 GHz band employed by Merrick in U.S. Pat. No. 3,810,179, where only one frequency is needed.

The present system is not detected by band sharing users because the chirp crosses the passband of a "channelized" receiver in a very short time. In this example, the chirp = 10 MHz, the pulse = 20 μs, of which only a very small portion actually fills the passband of, say, 12 KHz in a typical FM channel. The actual signal intercepted by any 12 KHz portion of the band is stated in equivalent pulse width:

$$\frac{\text{Pulse width in 12 KHz band}}{20 \text{ microsec}} = \frac{12 \text{ KHz}}{10 \text{ MHZ}} = .024 \text{ μsec} \approx 0.02\% \text{ or less}$$

of the chirp power being transmitted.

Given a reasonable distance separation of, say 100 meters between the chirp system antenna and a band sharing receiver having, say, a 2 dB noise figure, the isolation of the present system exceeds 100 dB and is undetectable in a conventional receiver. This is non-interference of a very high order.

In the reciprocal direction, a conventional transmitter must overwhelm the chirp receiver in order to cause any interference. The present embodiment guarantees 23 dB suppression of unwanted continuous wave (CW) signals plus the losses between the locations of the stations. The radiolocation use of the spectrum is generally a secondary use of an allocated band and thus subject to interference without recourse.

Over-all, the inventive system provides a very beneficial result in radiolocation. Heretofore, a 9 GHz system has been generally regarded as having a range of 15 miles, with a K-factor of 1.2. The present system can easily provide 160 dB gain at a K-factor of 3–4, or a range of 50 miles, considering the spreading loss advantage of, say, 435 MHz versus 9 GHz wavelengths. This results in a ten times increase in area coverage and is a substantial improvement of the system with a nominal radiated power, which will not bother other users.

An explanation of the K-factor is found in C. A. Burmister's article, "Electronics in Hydrographic Survey", *The International Hydrographic Review,* Monaco, 1949, pages 129-130.

As those skilled in the art know, various modifications may be made without departing from the invention. Therefore, the appended claims are to be construed to cover all equivalent structures falling within the true scope and spirit of the invention.

We claim:

1. A trilateralization position radar locating system having secondary user capabilities, said system comprising at least a master station and a stationary station, means for transmitting at least one linear and nonlimited radio ranging signal from said master station over a radio channel to said stationary station, said radio ranging signal having a predetermined repetition rate and a preprogrammed frequency change sweeping in one direction, means in said stationary station for identifying signals directed to it jointly responsive to an identification of the repetition rate and of said preprogrammed sweep of frequency, means at said stationary station responsive to the receipt of a signal identified by said repetition rate and by said preprogrammed sweep for transmitting at least one replying radio ranging signal from said stationary station to said master station with a predetermined repetition rate and with a preprogrammed frequency change sweeping in an opposite direction, and surface wave device means for causing said preprogrammed sweep of frequency change in said radio ranging signal responsive to a passage of an interrupted oscillatory signal through said device, said sweep frequency being free of superimposed modulating signals so that said transmitted signal is free of side bands, the frequency of said radio ranging signal sweeping past the frequency bands used by other and primary equipment fast enough to isolate primary and secondary user signals without causing any appreciable interference in said other and primary equipment.

2. The system of claim 1 and a voltage controlled oscillator means, said preprogrammed sweep of frequency change occurring responsive to an operation of said voltage controlled oscillator.

3. The system of claim 1 and a filter means, a delay line, and means whereby said filter has a characteristic which coincides with said preprogrammed frequency change, and said delay line times the response of said filter to coincide with the duration of said preprogrammed frequency change.

4. The system of claim 3 and means jointly responsive to said delay line and the receipt of a radio ranging signal for signalling an occurrence of said preprogrammed sweep signal.

5. The system of claim 4 wherein said filter comprises a tank circuit means tuned to respond with voltage change to said changing frequency.

6. The system of claim 1 wherein there are a plurality of said stationary stations and said radio ranging signals repeat cyclically, means individually associated with each of said stationary stations for individually identifying a different preprogrammed sweep of frequency changes responsive to the repetition rate of said radio ranging signals, and means at each of said stationary stations for transmitting said replying signal only when that station detects its preprogrammed sweep recurring at its repetition rate and for rejecting all other preprogrammed sweeps.

7. The system of claim 6 and means at said master station for measuring the time interval beginning with the transmission of said radio ranging signal and ending with receipt of the reply radio ranging system.

8. A secondary use of a radio frequency spectrum pulse signalling system having echo suppression, said system comprising a station having a send channel and a receive channel using the same wide frequency band, remote transponder means for receiving pulse signals on the send channel and reflectively returning the same pulse signals on the receive channel, means including a surface wave device for sweeping said pulse signal with a high speed preprogrammed shift of frequency to provide a chirp signal which sweeps past primary user bands fast enough to provide isolation with virtually no noise factor, and means for causing said sweep to move toward higher frequencies in one of said channels and toward lower frequencies on the other of said channels so that one channel signals with up-chirping and the other channel signals with down-chirping, whereby said station can distinguish between the signals which it sends and the reflection of those signals which the transponder returns.

9. The system of claim 8 wherein said signal pulses recur cyclically at station identifying repetition rates.

10. The system of claim 9 and means in each of said channels for recognizing and responding to an individually identifying one of said chirping signals recurring at a station identification rate assigned to the channel which responds to that signal.

11. The system of claim 10 wherein said sweeping occurs at such a rapid rate that the shifting frequencies in the two channels pass a cross-over point common to both said up-chirping and said down-chirping too fast to cause response except in the proper channel.

12. A method of signal channel frequency allocation comprising the steps of:
  (a) assigning a predetermined frequency band to a primary user having receivers with band pass filters tuned to pass said frequency band;
  (b) assigning said predetermined frequency band to secondary users having send and receive signal channels also tuned to said band;
  (c) transmitting preprogrammed signals over said secondary users signal channels in said predetermined frequency band; and
  (d) sweeping the frequency in said secondary users signal system past the band of said primary users signals at a rapid rate to preclude an interference.

13. The method of claim 12 wherein step (d) requires said frequencies to sweep in one direction in said send channel and in the opposite direction in said receive channel.

14. The method of claim 13 wherein said preprogrammed signals recur at a repetition rate which individually identifies individual signal channels.

15. A secondary user radar system using chirp signalling comprising a plurality of stations, each of said stations being identified by cyclically recurring bursts of unmodulated radio frequency signals which are free of side bands, said bursts recurring with a burst repetition rate individually assigned to identify each of said stations, means for transmitting signals from one of said stations to a transponder station which reflectively returns the same modulated signal to the transmitting station, means in said transmitting station for changing said radio frequency in a preprogrammed manner to produce a chirp signal during each burst of radio frequency, and means in said transponder station for reflectively returning said same signal to said station while precluding intersignal interference by using a different preprogrammed frequency change to produce a different form of chirp signal, the frequency changes sweeping by the assigned pass bands of primary users of the same frequencies within a time period which is short enough to produce a high level of isolation between signals of said primary and secondary users.

16. The system of claim 15 wherein one of said chirp signal forms is an up-chirp and another of said chirp signal forms is a down-chirp.

17. The system of claim 16 wherein said preprogrammed signal occurs responsive to an operation of at least one surface wave device.

18. The system of claim 16 wherein said preprogrammed signal occurs responsive to an operation of a voltage controlled oscillator.

19. The system of claim 16 wherein said preprogrammed signal is detected by a combination of a filter, a delay line and a coincidence detection means which compares a signal which has passed through said delay line with a signal which is then being received, and means including said filter for passing signals to said detection means only if said signals have a frequency which changes at a predetermined rate.

* * * * *